US012030272B2

(12) United States Patent
Pitkänen

(10) Patent No.: US 12,030,272 B2
(45) Date of Patent: Jul. 9, 2024

(54) PISTON-CYLINDER ASSEMBLY OF A HYDRAULIC PRESS

(71) Applicant: VAHTERUS OY, Kalanti (FI)

(72) Inventor: Paavo Pitkänen, Uusikaupunki (FI)

(73) Assignee: VAHTERUS OY, Kalanti (FI)

( * ) Notice: Subject to any disclaimer, the term of this patent is extended or adjusted under 35 U.S.C. 154(b) by 302 days.

(21) Appl. No.: 17/630,753

(22) PCT Filed: Jul. 24, 2020

(86) PCT No.: PCT/FI2020/050504
§ 371 (c)(1),
(2) Date: Jan. 27, 2022

(87) PCT Pub. No.: WO2021/019129
PCT Pub. Date: Feb. 4, 2021

(65) Prior Publication Data

US 2022/0258444 A1 Aug. 18, 2022

(30) Foreign Application Priority Data

Jul. 29, 2019 (FI) ..................................... 20195653

(51) Int. Cl.
*B30B 1/34* (2006.01)
*B30B 1/32* (2006.01)
(Continued)

(52) U.S. Cl.
CPC ................ *B30B 1/34* (2013.01); *B30B 1/323* (2013.01); *F15B 3/00* (2013.01); *F15B 11/0365* (2013.01);
(Continued)

(58) Field of Classification Search
CPC .. B30B 1/34; B30B 1/32; B30B 1/323; B30B 15/0052; B30B 15/065; F15B 3/00; F15B 11/0365; F15B 15/1409; F15B 15/149; F15B 15/1428; F15B 15/036; B21D 24/005
See application file for complete search history.

(56) References Cited

U.S. PATENT DOCUMENTS 845,144 A 2/1907 Taylor
2,829,498 A 4/1958 Ferguson
(Continued)

FOREIGN PATENT DOCUMENTS

CN 2845947 12/2006
DE 10 2010 011 239 9/2011
(Continued)

OTHER PUBLICATIONS

International Search Report for PCT/FI2020/050504 mailed Nov. 4, 2020, 3 pages.
(Continued)

*Primary Examiner* — Jimmy T Nguyen
(74) *Attorney, Agent, or Firm* — NIXON & VANDERHYE

(57) ABSTRACT

Disclosed is a piston-cylinder assembly of a hydraulic press, which includes a basic cylinder and a first and second piston. A ring cylinder is formed above the basic cylinder as a continuation of the cylinder structure. The first piston is located inside the basic cylinder in the bottom part of the basic cylinder and the second piston is located above the first piston in the top part of the cylinder structure. The piston-cylinder assembly has a first hydraulic fluid space below the first piston and a second hydraulic fluid space below the second piston and the piston-cylinder assembly includes a unified hydraulic fluid channel in flow connection to the first hydraulic fluid space in order to provide a pressure effect in the first piston and to the second hydraulic fluid space in order to provide a pressure effect in the second piston.

20 Claims, 6 Drawing Sheets

SECTION A-A

(51) Int. Cl.

| | |
|---|---|
| ***F15B 3/00*** | (2006.01) |
| ***F15B 11/036*** | (2006.01) |
| ***F15B 15/14*** | (2006.01) |

(52) U.S. Cl.
CPC ........ *F15B 15/1409* (2013.01); *F15B 15/149* (2013.01)

(56) References Cited

U.S. PATENT DOCUMENTS

| | | | |
|---|---|---|---|
| 2,956,549 | A | 10/1960 | Malpass |
| 3,311,049 | A | 3/1967 | Wilfried |
| 2003/0047335 | A1 | 3/2003 | Nguyen et al. |

FOREIGN PATENT DOCUMENTS

| | | | |
|---|---|---|---|
| EP | 0 561 074 | 9/1993 | |
| FR | 2 290 970 | 6/1976 | |
| KR | 20090012758 A * | 2/2009 | ............ B30B 15/22 |

OTHER PUBLICATIONS

Written Opinion of the ISA for PCT/FI2020/050504 mailed Nov. 4, 2020, 5 pages.
Written Opinion of the International Preliminary Examining Authority for PCT/FI2020/050504 mailed Jul. 30, 2021, 5 pages.
International Preliminary Report on Patentability for PCT/FI2020/05050 mailed Nov. 17, 2021, 23 pages.
Search Report for FI20195653 dated Mar. 27, 2020, one (1) page.

* cited by examiner

PISTON-CYLINDER ASSEMBLY OF A HYDRAULIC PRESS

This application is the U.S. national phase of International Application No. PCT/FI2020/050504 filed Jul. 24, 2020 which designated the U.S. and claims priority to FI Patent Application No. 20195653 filed Jul. 29, 2019, the entire contents of each of which are hereby incorporated by reference.

BACKGROUND OF THE INVENTION

Field of the Invention

The invention relates to a piston-cylinder assembly of a hydraulic press.

Description of the Related Art

Hydraulic forming is used for forming plates or other pieces via force achieved by static fluid pressure in a hydraulic press. In the hydraulic press the force achieved via the piston-cylinder assembly is directed onto the piece to be formed in order to achieve a desired forming effect. The operation of the hydraulic press is based on Pascal's law, according to which external pressure spreads evenly all over a fluid and thus the force achieved in the hydraulic press is the pressure of the hydraulic fluid multiplied by the piston's surface area.

Publication FR2290970A1 shows an assembly for a stamping tool, where two hydraulic pistons are used, in which assembly the hydraulic fluid is brought into the piston-cylinder assembly from the end and the side, i.e. through two different hydraulic fluid channels.

Publication CN2845947Y shows an assembly for forming metal, where two hydraulic pistons are used, in which assembly the hydraulic fluid is brought in through two different hydraulic fluid channels.

Publication EP0561074A1 shows a cylinder operable with a working fluid, comprising a cylinder unit comprising a plurality of cylinder bodies and a partition member between a first cylinder body and a second cylinder body to define a plurality of cylinder chambers arranged in series in an axial direction, each one of said plurality of cylinder bodies containing one piston having an acting side and an opposite, back side, in which seals are provided between the partition member and the first cylinder body and second cylinder body.

One problem with piston-cylinder assemblies of hydraulic presses known from prior art is that in order to achieve a sufficient working force, the size of the assembly grows, which further leads to a large space requirement in the press.

One disadvantage with piston-cylinder assemblies of hydraulic presses known from prior art is that when using two pistons for increasing force, the channel structure for the hydraulic fluid becomes complicated and thus also the structure of the assembly itself becomes complicated and difficult to control.

SUMMARY OF THE INVENTION

The object of the invention is to achieve an improved piston-cylinder assembly of a hydraulic press, where problems and disadvantages of solutions known from prior art have been eliminated or at least minimized.

One particular object of the invention is to create a piston-cylinder assembly of a hydraulic press, where problems and disadvantages of solutions known from prior art, particularly related to the large size and space requirement of the assembly in the press, are eliminated or at least minimized.

Another particular object of the invention is to create a piston-cylinder assembly of a hydraulic press, where problems and disadvantages of solutions known from prior art, particularly related to the complicated channel structure for hydraulic fluid in applications using two pistons, are eliminated or at least minimized.

The piston-cylinder assembly of a hydraulic press according to the invention comprises a basic cylinder and a first and second piston, where a ring cylinder has been attached above the basic cylinder as a continuation of the cylinder structure, the first piston is located inside the basic cylinder in the bottom part of the basic cylinder and the second piston is located above the first piston in the top part of the cylinder structure, where the piston-cylinder assembly has a first hydraulic fluid space below the first piston and a second hydraulic fluid space below the second piston and the piston-cylinder assembly comprises a unified hydraulic fluid channel in flow connection to the first hydraulic fluid space in order to provide a pressure effect in the first piston and to the second hydraulic fluid space in order to provide a pressure effect in the second piston.

According to an advantageous additional characteristic feature of the invention, the hydraulic fluid channel comprises a first hydraulic fluid channel section, which is located to run through the bottom of the basic cylinder, a second hydraulic fluid channel section, which is located to run through the first piston, and transverse third hydraulic fluid channel sections, which continue radially from the second hydraulic fluid channel section.

According to an advantageous additional characteristic feature of the invention, the first hydraulic fluid channel section is in flow connection with the first hydraulic fluid space and the third radial hydraulic fluid channel sections are in flow connection with the second hydraulic fluid space.

According to an advantageous additional characteristic feature of the invention, the cylinder structure of the piston-cylinder assembly comprises a spacer ring, which is located below the ring cylinder and inside the basic cylinder.

According to an advantageous additional characteristic feature of the invention, the first piston and second piston are attached to each other with an attaching arrangement.

According to an advantageous additional characteristic of the invention, the basic cylinder and ring cylinder in the cylinder structure of the piston-cylinder assembly are attached to each other with an attaching arrangement.

According to an advantageous additional characteristic feature of the invention, the first hydraulic fluid space of the piston-cylinder assembly is sealed against the inner periphery of the basic cylinder with a first sealing ring and the second hydraulic fluid space is sealed against the inner surface of the ring cylinder with a second sealing ring.

According to an advantageous additional characteristic feature of the invention, the spacer ring is sealed, via a protrusion, against the outer periphery of the first piston.

According to an advantageous additional characteristic of the invention, the space between the first piston and the spacer ring inside the basic cylinder is non-pressurized.

According to an advantageous additional characteristic feature of the invention, the surface areas of the pistons, lower piston and ring piston, of the piston-cylinder assembly are dimensioned so that a desired force is achieved.

The invention can be used in connection with many different types of hydraulic presses for forming and piercing metal plates.

The invention and its advantageous additional characteristics help to achieve a compact and simultaneously forceful piston-cylinder assembly of a hydraulic press, because the assembly has two pistons in one cylinder, whereby a force is achieved, where the achieved force is the pressure of the hydraulic fluid multiplied by the surface area of the two pistons.

In this description and in the claims the terms below, above, lower part, upper part and so on are not meant to limit as such the use and/or operating position of the piston-cylinder assembly, but the expressions in question are only meant to express the mutual position of the parts and part assemblies. In view of the piston-cylinder assembly for example, the term "below" means the side, from which the hydraulic fluid is brought to the piston-cylinder assembly.

BRIEF DESCRIPTION OF THE DRAWINGS

In the following, the invention is described in more detail with reference to the figures of the appended drawing, to the details of which figures the invention is by no means intended to be narrowly limited.

FIG. 1A shows the piston-cylinder assembly seen from the outside and FIG. 1B shows a sectional view A-A of FIG. 1A.

In FIG. 2A the piston is in the lower position and in FIG. 2B the piston is in the upper position.

FIG. 4A shows the piston-cylinder assembly seen from the outside and FIG. 4B shows a sectional view A-A of FIG. 4A.

In FIG. 5A the piston is in the lower position and in FIG. 5B the piston is in the upper position.

DESCRIPTION OF THE PREFERRED EMBODIMENTS

Figure 1B:
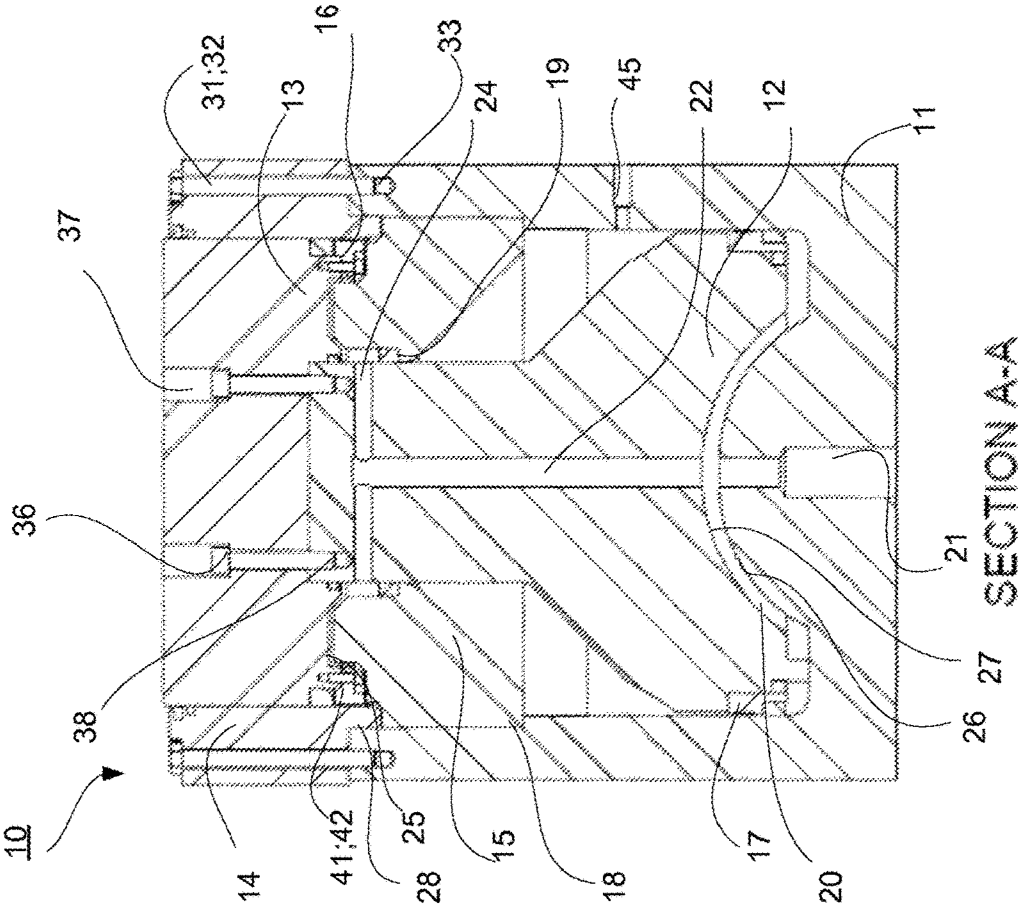
FIGS. 1A-1B show as a schematic view one advantageous example of a piston-cylinder assembly of a hydraulic press.
Figure 1A:
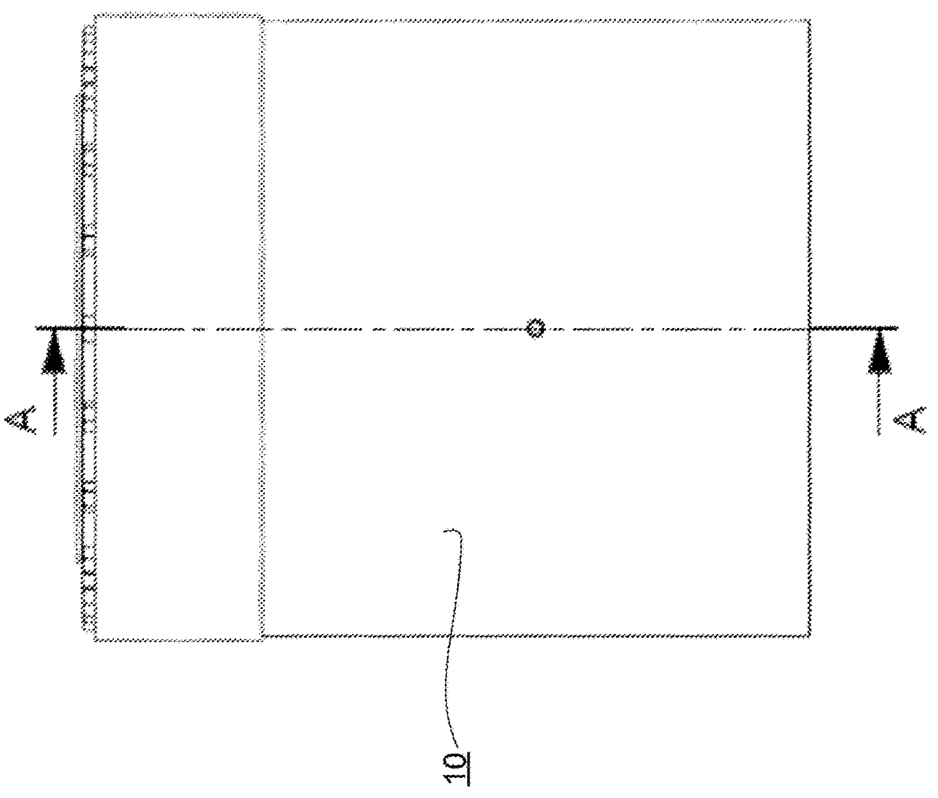
Figure 2B:
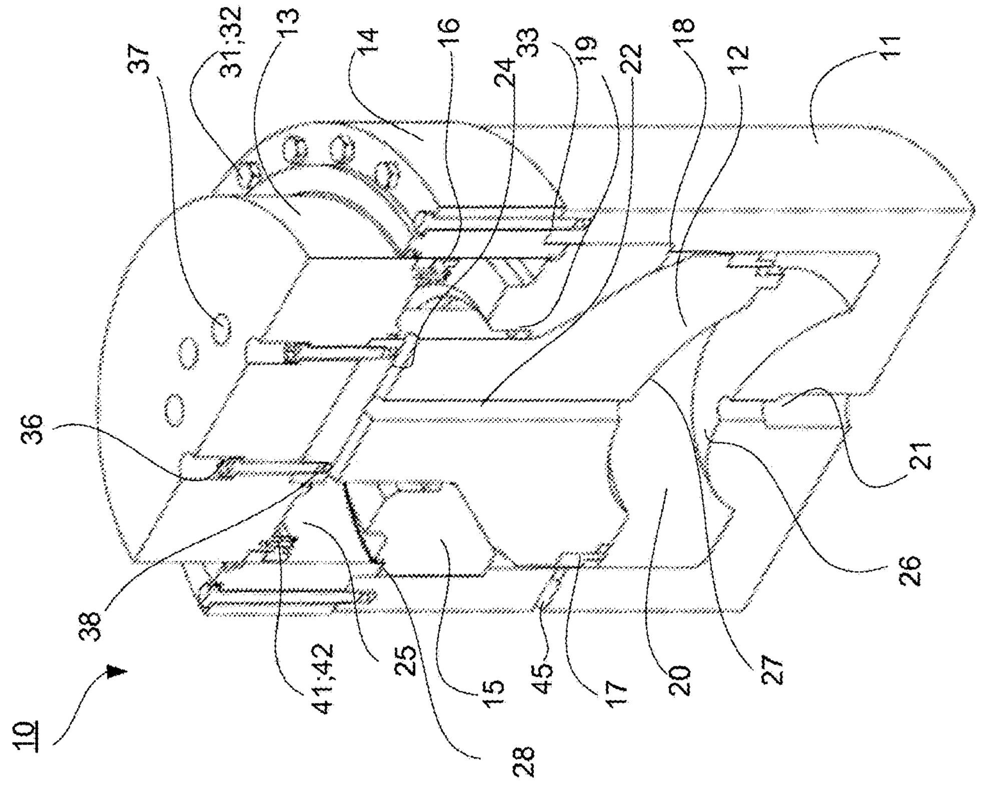
FIGS. 2A-2B show the example of FIGS. 1A-1B of a piston-cylinder assembly of a hydraulic press as a schematic view, cut along sectional line A-A of FIG. 1A.
Figure 2A:
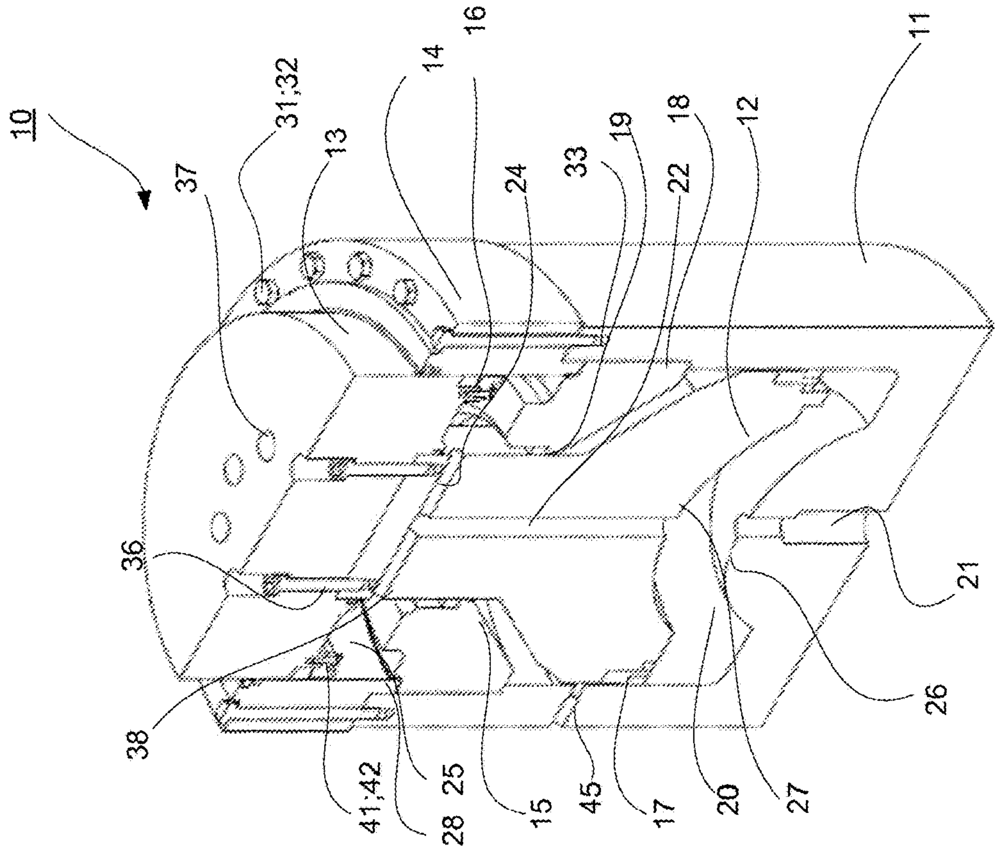
Figure 3:
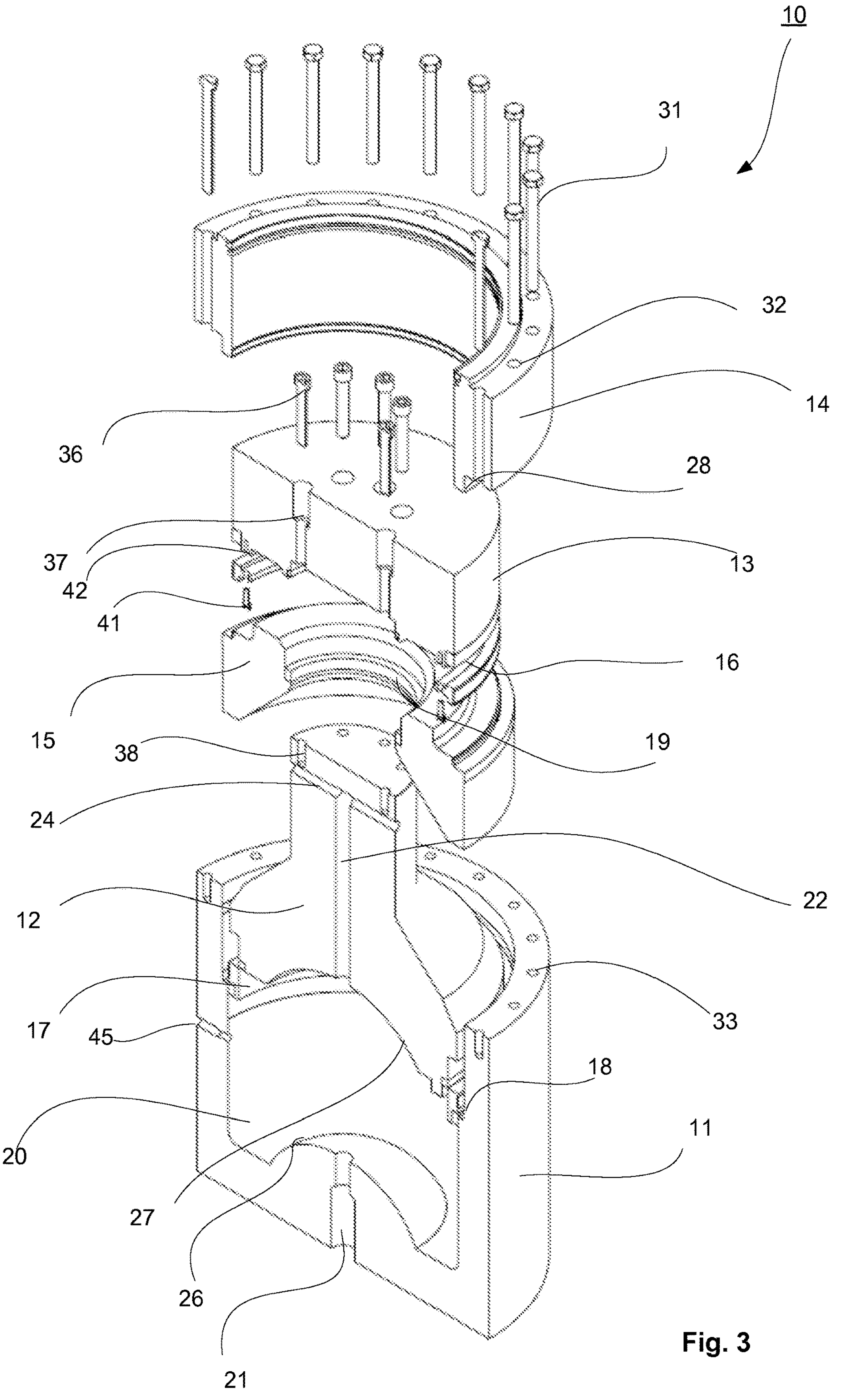
FIG. 3 shows as a schematic view the example of FIGS. 1A-2B of a piston-cylinder assembly as an assembly view.
Figure 4B:
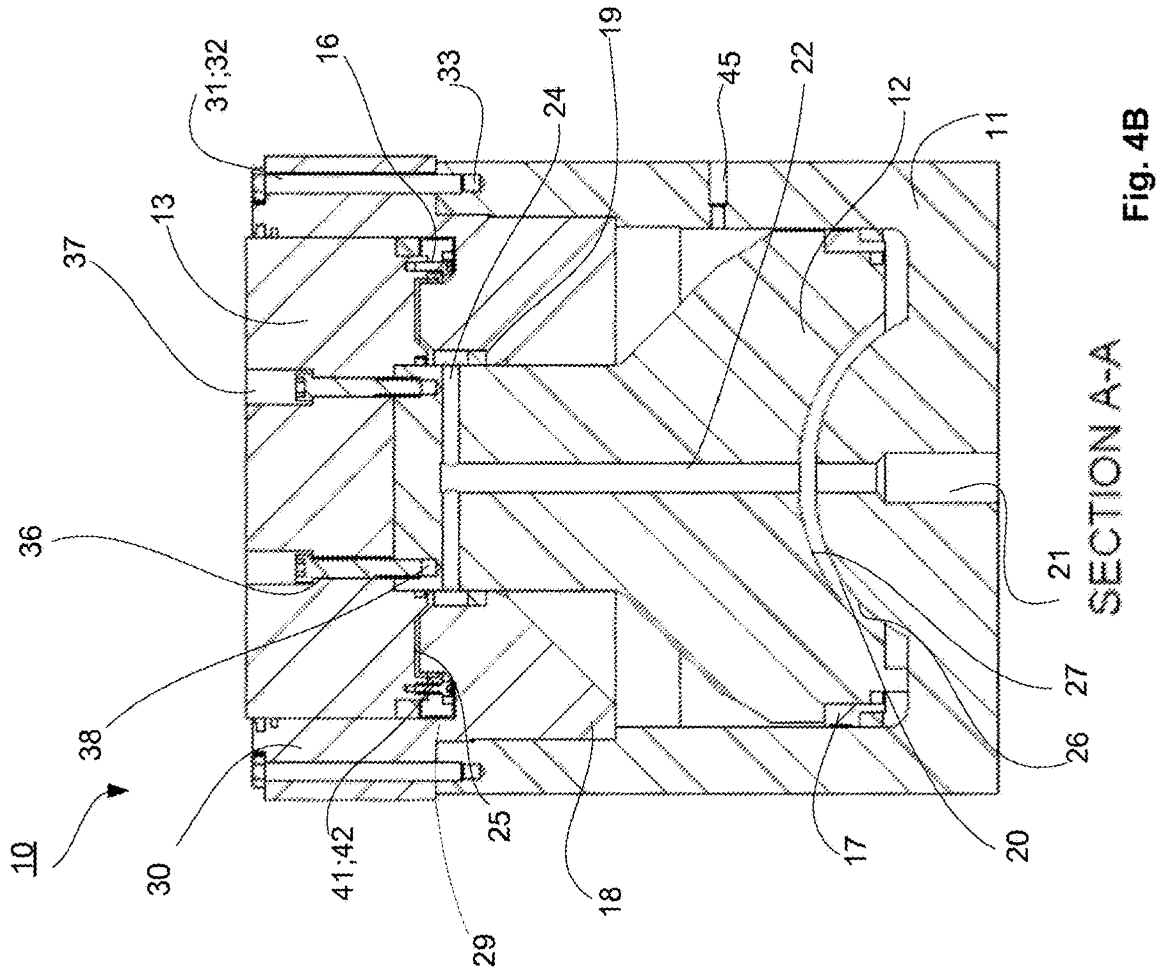
FIGS. 4A-4B show as a schematic view a second advantageous example of a piston-cylinder assembly of a hydraulic press according to the invention.
Figure 4A:
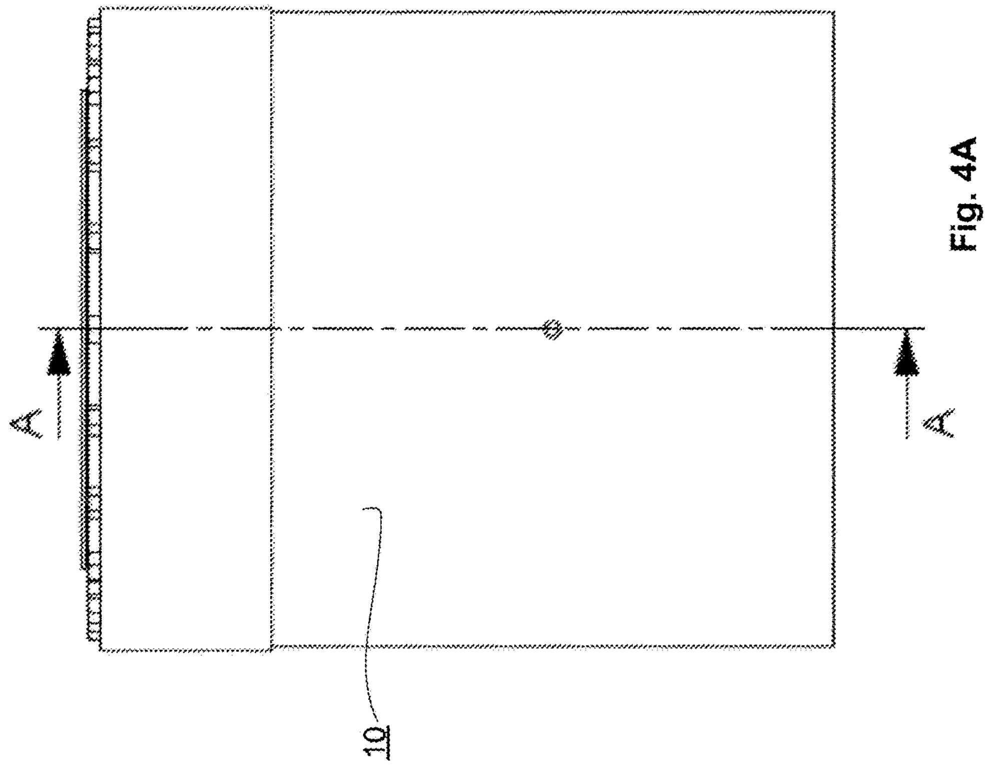
Figure 5B:
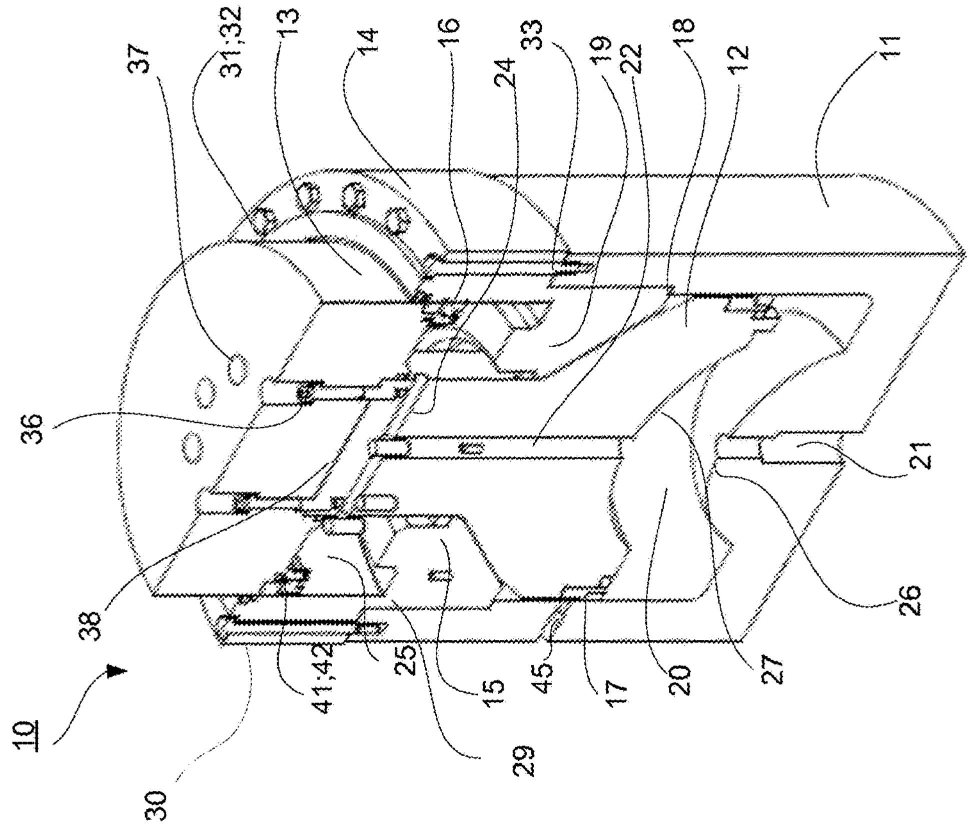
FIGS. 5A-5B show the example of FIGS. 4A-4B of a piston-cylinder assembly of a hydraulic press according to the invention as a schematic view, cut along sectional line A-A of FIG. 4A.
Figure 5A:
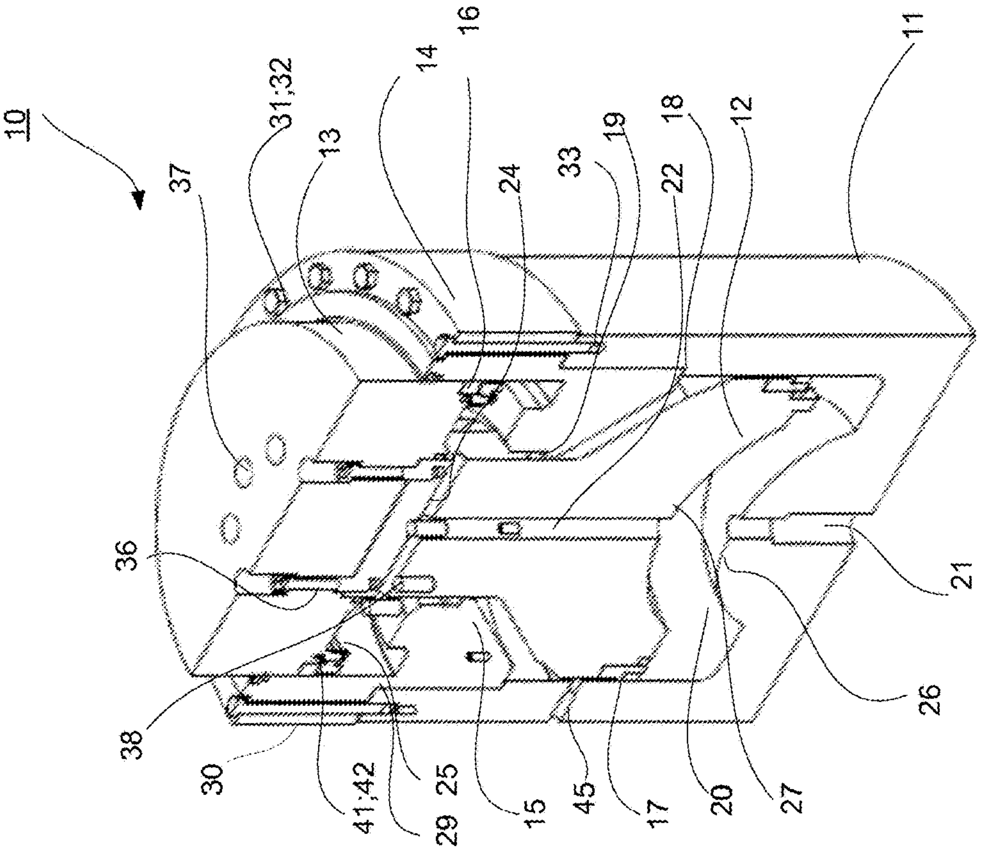
Figure 6:
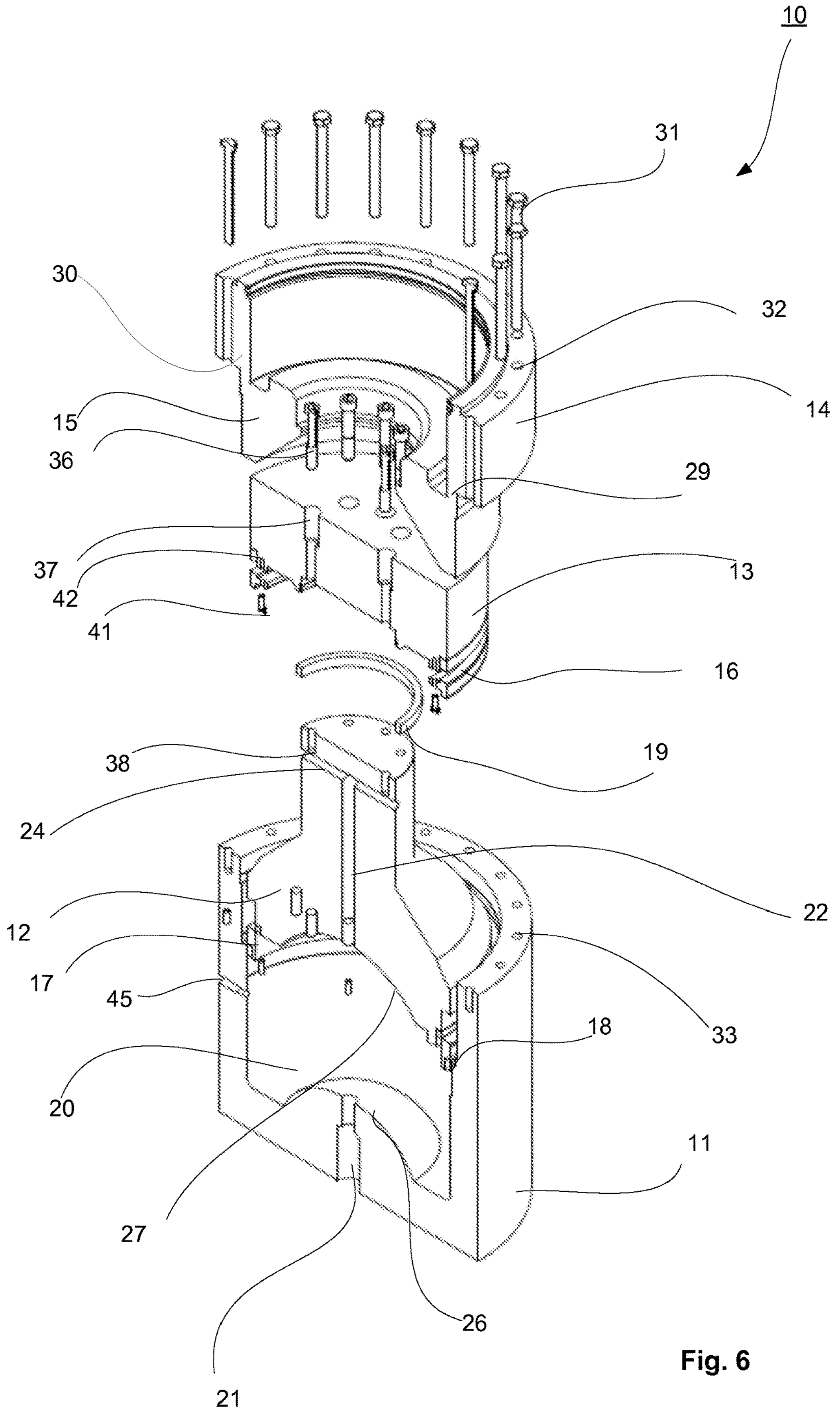
FIG. 6 shows as a schematic view the example of FIGS. 4A-5B of a piston-cylinder assembly according to the invention as an assembly view.

In the following description, corresponding elements, parts and part assemblies have been indicated with corresponding reference numbers and markings in FIGS. 1A-6 unless otherwise mentioned, and it should be understood that the examples can be modified for different applications and different situations. From some figures some repeated reference markings may have been left out for the sake of clarity of the figures. In the following description, even though certain features are described in a certain context and application, the features can be applied also in another context and application regardless of if this has been mentioned, and many modifications and variations are thus possible.

FIGS. 1A-3 show as a schematic view one example of a piston-cylinder assembly 10 of a hydraulic press, which comprises a basic cylinder 11 and a ring cylinder 14 attached to its top surface. The piston-cylinder assembly 10 further comprises two pistons 12, 13; a first piston 12, which is located inside the basic cylinder 11, in the lower part of the basic cylinder 11, and a second piston 13, which is located above the first piston 12 and the basic cylinder 11.

The first piston 12 and the second piston 13 are attached to each other with an attaching arrangement 36, 37, 38, which comprises screws 36, which run through penetrating holes 37 made in the second piston 13 and attach to attaching holes 38 in the first piston 12.

In the cylinder structure of the piston-cylinder assembly 10 the basic cylinder 11 and the ring cylinder 14 are attached to each other with an attaching arrangement 31, 32, 33, which comprises screws 31, which run through penetrating holes 32 made in the ring cylinder 14 and attach to attaching holes 33 in the basic cylinder 11. Thus, the ring cylinder 14 forms a continuing part to the basic cylinder 11.

The cylinder structure 11, 14 of the piston-cylinder assembly 10 also comprises a spacer ring 15, which is located below the ring cylinder 14 and inside the basic cylinder 11. The spacer ring 15 is supported from below on a shoulder 18 made on the inner periphery of the basic cylinder 11 and from above on a protrusion 28 in the ring cylinder 14. The spacer ring 15 is via a protrusion 19 sealed against the outer periphery of the first piston 12, so that hydraulic fluid is not led from the second hydraulic fluid space 25 to the space between the spacer ring 15 and the first piston 12 inside the basic cylinder 11.

The first hydraulic fluid space 20 below the first piston 12 is formed between the lower surface 27 of the piston 12 and the inner lower surface 26 of the basic cylinder 11 and is sealed against the inner periphery of the basic cylinder 11 with a first sealing ring 17. Inside the ring cylinder 14, between the upper surface of the spacer ring 15 and the lower surface of the second piston 13, has been formed a second hydraulic fluid space 25 and it is sealed against the inner surface of the ring cylinder 14 with a second sealing ring 16. The second sealing ring 16 is attached to the second piston 13 with an attaching arrangement 41, 42, which comprises attaching screws 41 running through the sealing ring 16, which screws attach to attaching holes 42 made in the lower surface of the second piston 13.

The pressurized hydraulic fluid is led to the first hydraulic fluid space 20 via the first hydraulic fluid channel section 21 in order to achieve hydraulic pressure directed at the first piston 12. The hydraulic fluid channel 21 is located to run through the bottom of the basic cylinder 11, by its mid axis. The hydraulic fluid is led onwards via the second hydraulic fluid channel section 22, which runs through the first piston 12 by its mid axis and ends in radial, transverse third hydraulic fluid channel sections 24, and via the third hydraulic fluid channels 24 to the second hydraulic fluid space 25 in order to achieve hydraulic pressure directed at the second piston 13. The channel sections 21, 22, 24 thus form a unified hydraulic fluid channel 21, 22, 24 in flow connection to the first hydraulic fluid space 20 and thus in order to achieve a pressure effect in the first piston 12 and to the second hydraulic fluid space 25 and thus in order to achieve a pressure effect in the second piston 13.

The force achievable with the piston-cylinder assembly 10 is thus the pressure of the hydraulic fluid multiplied by the sum of the surface areas of the first and second piston, whereby a great force is achieved without increasing the diameter of the piston-cylinder assembly 10. Thus, the piston-cylinder assembly 10 is compact and its space requirement is small. Additionally, the channel and other structure of the piston-cylinder assembly 10 is simple.

The space between the first piston 12 and the spacer ring 15 is non-pressurized inside the basic cylinder 11 and is thus not for hydraulic fluid, and if hydraulic fluid erupts from a so-called leak alert hole in a channel 45 made in the wall of the basic cylinder 11, it is known that the sealing rings 16, 17 and/or the sealing protrusion 19 and thus the piston-cylinder assembly 10 do not function in a desired manner.

The inside lower surface of the basic cylinder 11 advantageously comprises a ball segment-shaped protrusion protruding inwards around the outlet of the hydraulic fluid channel 21, and correspondingly, the first piston 12 advantageously comprises on its lower surface a corresponding ball segment-shaped recess in order to strengthen the structure of the piston-cylinder assembly 10 and its first hydraulic fluid space 20.

FIGS. 4A-6 show as a schematic view a second example of a piston-cylinder assembly 10 of a hydraulic press, which comprises a basic cylinder 11 and a ring cylinder 14 attached to its upper surface, which ring cylinder is via a collar ring 29, which is one piece with the ring cylinder, connected to a spacer ring 15 into the same one piece, whereby a unified ring cylinder assembly 30 is formed. The piston-cylinder assembly 10 further comprises two pistons 12, 13; a first piston 12, which is located inside the basic cylinder 11, in the lower part of the basic cylinder 11, and a second piston 13, which is located above the first piston 12 and the basic cylinder 11.

The first piston 12 and the second piston 13 are attached to each other with an attaching arrangement 36, 37, 38, which comprises screws 36, which run through penetrating holes 37 made in the second piston 13 and attach to attaching holes 38 in the first piston 12.

In the cylinder structure of the piston-cylinder assembly 10 the basic cylinder 11 and the ring cylinder 14 are attached to each other with an attaching arrangement 31, 32, 33, which comprises screws 31, which run through penetrating holes 32 made in the ring cylinder 14 and attach to attaching holes 33 in the basic cylinder 11. Thus, the ring cylinder 14 forms a continuing part to the basic cylinder 11.

The ring cylinder assembly 30 of the piston-cylinder assembly 10 comprises the ring cylinder 14 and the spacer ring 15, which is below the ring cylinder 14, which are connected into one piece via the collar ring 29. The outer diameter of the ring cylinder 14 of the ring cylinder assembly 30 is substantially the same as the outer diameter of the basic cylinder 11. Via the indentation achievable via the collar ring 29, the spacer ring 15 of the ring cylinder assembly 30 is set to be located inside the basic cylinder 11. The spacer ring 15 is supported from below on a shoulder made on the inner periphery of the basic cylinder 11. The spacer ring 15 is via a sealing 19 sealed against the outer periphery of the first piston 12, so that hydraulic fluid is not led from the second hydraulic fluid space 25 to the space between the spacer ring 15 and the first piston 12 inside the basic cylinder 11.

The first hydraulic fluid space 20 below the first piston 12 is formed between the lower surface of the piston 12 and the inner lower surface of the basic cylinder 11 and is sealed against the inner periphery of the basic cylinder 11 with a first sealing ring 17. Inside the ring cylinder 14, between the upper surface of the spacer ring 15 and the lower surface of the second piston 13, has been formed a second hydraulic fluid space 25 and it is sealed against the inner surface of the ring cylinder 14 with a second sealing ring 16. The second sealing ring 16 is attached to the second piston 13 with an attaching arrangement 41, 42, which comprises attaching screws 41 running through the sealing ring 16, which screws attach to attaching holes 42 made in the lower surface of the second piston 13.

The pressurized hydraulic fluid is led to the first hydraulic fluid space 20 via the first hydraulic fluid channel section 21 in order to achieve hydraulic pressure directed at the first piston 12. The hydraulic fluid channel 21 is located to run through the bottom of the basic cylinder 11, by its mid axis. The hydraulic fluid is led onwards via the second hydraulic fluid channel section 22, which runs through the first piston 12 by its mid axis and ends in radial, transverse third hydraulic fluid channel sections 24, and via the third hydraulic fluid channels 24 to the second hydraulic fluid space 25 in order to achieve hydraulic pressure directed at the second piston 13. The channel sections 21, 22, 24 thus form a unified hydraulic fluid channel 21, 22, 24 in flow connection to the first hydraulic fluid space 20 and thus in order to achieve a pressure effect in the first piston 12 and to the second hydraulic fluid space 25 and thus in order to achieve a pressure effect in the second piston 13.

The force achievable with the piston-cylinder assembly 10 is thus the pressure of the hydraulic fluid multiplied by the sum of the surface areas of the first and second piston, whereby a great force is achieved without increasing the diameter of the piston-cylinder assembly 10. Thus, the piston-cylinder assembly 10 is compact and its space requirement is small. Additionally, the channel and other structure of the piston-cylinder assembly 10 is simple.

The space between the first piston 12 and the spacer ring 15 is depressurized inside the basic cylinder 11 and is thus not for hydraulic fluid, and if hydraulic fluid erupts from a so-called leak alert hole in a channel 45 made in the wall of the basic cylinder 11, it is known that the sealing rings 16, 17 and/or the sealing protrusion 19 and thus the piston-cylinder assembly 10 do not function in a desired manner.

The inside lower surface of the basic cylinder 11 advantageously comprises a ball segment-shaped protrusion protruding inwards around the outlet of the hydraulic fluid channel 21, and correspondingly, the first piston 12 advantageously comprises on its lower surface a corresponding ball segment-shaped recess in order to strengthen the structure of the piston-cylinder assembly 10 and its first hydraulic fluid space 20.

The invention has been described above only with reference to one advantageous example of it, to the details of which it is however not meant to narrowly limit the invention, but many modifications and variations are possible within the inventive idea defined by the following claims.

The invention claimed is:

1. A piston-cylinder assembly of a hydraulic press, the piston-cylinder assembly comprising:
   - a basic cylinder,
   - a first piston,
   - a second piston,
   - a ring cylinder positioned on top of the basic cylinder as a continuation of the basic cylinder to form a cylinder structure, the first piston is located inside the basic cylinder in a bottom part of the basic cylinder and the second piston is located within the ring cylinder and above the first piston in a top part of the cylinder structure, the piston-cylinder assembly has a first hydraulic fluid space below the first piston and a second hydraulic fluid space below the second piston, and
   - a unified hydraulic fluid channel in flow connection to the first hydraulic fluid space in order to provide a pressure effect in the first piston and to the second hydraulic fluid space in order to provide a pressure effect in the second piston, wherein the top part of the cylinder structure of the piston-cylinder assembly comprises a ring cylinder assembly, wherein the ring cylinder assembly comprises the ring cylinder, a spacer ring positioned below the ring cylinder, and a collar ring, that the ring cylinder is via the collar ring, which is one piece with the ring cylinder, connected to the spacer ring into the same one piece, whereby the ring cylinder assembly is formed unified in one piece that includes the ring cylinder, the spacer ring, and the collar ring.

2. The piston-cylinder assembly of a hydraulic press according to claim 1, wherein the hydraulic fluid channel comprises a first hydraulic fluid channel section, which is located to run through the bottom of the basic cylinder, a second hydraulic fluid channel section, which is located to run through the first piston, and transverse third hydraulic fluid channel sections, which continue radially from the second hydraulic fluid channel section.

3. The piston-cylinder assembly of a hydraulic press according to claim 2, wherein the first hydraulic fluid channel section is in flow connection to the first hydraulic fluid space and that the third radial hydraulic fluid channel sections are in flow connection to the second hydraulic fluid space.

4. The piston-cylinder assembly of a hydraulic press according to claim 1, wherein the first piston and the second piston are attached to each other with an attaching arrangement.

5. The piston-cylinder assembly of a hydraulic press according to claim 1, wherein the first hydraulic fluid space of the piston-cylinder assembly is sealed against an inner periphery of the basic cylinder with a first sealing ring and the second hydraulic fluid space is sealed against the inner surface of the ring cylinder with a second sealing ring.

6. The piston-cylinder assembly of a hydraulic press according to claim 1, wherein the spacer ring is via a protrusion and/or sealing sealed against an outer periphery of the first piston.

7. The piston-cylinder assembly of a hydraulic press according to claim 1, wherein a space between the first piston and the spacer ring inside the basic cylinder is depressurized.

8. The piston-cylinder assembly of a hydraulic press according to claim 2, wherein the first piston and the second piston are attached to each other with an attaching arrangement.

9. The piston-cylinder assembly of a hydraulic press according to claim 3, wherein the first piston and the second piston are attached to each other with an attaching arrangement.

10. The piston-cylinder assembly of a hydraulic press according to claim 2, wherein the first hydraulic fluid space of the piston-cylinder assembly is sealed against an inner periphery of the basic cylinder with a first sealing ring and the second hydraulic fluid space is sealed against the inner surface of the ring cylinder with a second sealing ring.

11. The piston-cylinder assembly of a hydraulic press according to claim 3, wherein the first hydraulic fluid space of the piston-cylinder assembly is sealed against an inner periphery of the basic cylinder with a first sealing ring and the second hydraulic fluid space is sealed against the inner surface of the ring cylinder with a second sealing ring.

12. The piston-cylinder assembly of a hydraulic press according to claim 4, wherein the first hydraulic fluid space of the piston-cylinder assembly is sealed against an inner periphery of the basic cylinder with a first sealing ring and the second hydraulic fluid space is sealed against the inner surface of the ring cylinder with a second sealing ring.

13. The piston-cylinder assembly of a hydraulic press according to claim 2, wherein the spacer ring is via a protrusion and/or sealing sealed against an outer periphery of the first piston.

14. The piston-cylinder assembly of a hydraulic press according to claim 3, wherein the spacer ring is via a protrusion and/or sealing sealed against an outer periphery of the first piston.

15. The piston-cylinder assembly of a hydraulic press according to claim 4, wherein the spacer ring is via a protrusion and/or sealing sealed against an outer periphery of the first piston.

16. The piston-cylinder assembly of a hydraulic press according to claim 5, wherein the spacer ring is via a protrusion and/or sealing sealed against an outer periphery of the first piston.

17. The piston-cylinder assembly of a hydraulic press according to claim 2, wherein a space between the first piston and the spacer ring inside the basic cylinder is depressurized.

18. The piston-cylinder assembly of a hydraulic press according to claim 3, wherein a space between the first piston and the spacer ring inside the basic cylinder is depressurized.

19. The piston-cylinder assembly of a hydraulic press according to claim 4, wherein a space between the first piston and the spacer ring inside the basic cylinder is depressurized.

20. The piston-cylinder assembly of a hydraulic press according to claim 5, wherein a space between the first piston and the spacer ring inside the basic cylinder is depressurized.

* * * * *